United States Patent [19]

Dewar et al.

[11] Patent Number: 4,645,348

[45] Date of Patent: Feb. 24, 1987

[54] SENSOR-ILLUMINATION SYSTEM FOR USE IN THREE-DIMENSIONAL MEASUREMENT OF OBJECTS AND ASSEMBLIES OF OBJECTS

[75] Inventors: Robert Dewar, Troy; Jeremy Salinger, Southfield; Thomas J. Waldecker, Ypsilanti; Neil E. Barlow, Royal Oak, all of Mich.

[73] Assignee: Perceptron, Inc., Farmington Hills, Mich.

[21] Appl. No.: 528,726

[22] Filed: Sep. 1, 1983

[51] Int. Cl.[4] .............................................. G01B 11/24
[52] U.S. Cl. ..................................................... 356/376
[58] Field of Search .................... 356/375, 376, 394, 1; 382/57

[56] References Cited

U.S. PATENT DOCUMENTS

| | | | |
|---|---|---|---|
| 3,814,521 | 6/1974 | Free | 356/376 |
| 4,111,557 | 9/1978 | Rottenkolber et al. | 356/394 |
| 4,155,650 | 5/1979 | Yasue et al. | 356/387 |
| 4,188,544 | 2/1980 | Chasson | 356/376 |
| 4,335,962 | 6/1982 | DiMatteo et al. | 250/560 |
| 4,343,553 | 8/1982 | Nakagawa et al. | 356/376 |

OTHER PUBLICATIONS

Tolanski, S., "A Topographic Microscope", *Scientific American*, Aug. 1954, pp. 54–59.

*Primary Examiner*—R. A. Rosenberger
*Attorney, Agent, or Firm*—Harness, Dickey & Pierce

[57] ABSTRACT

A three-dimensional triangulation-type sensor-illumination system adapted for connection to a machine vision computer. The illumination source in the preferred system comprises a unique cross hair light pattern which provides sufficient image data to the computer to enable the computer to make three-dimensional measurements of a wide variety of features, including edges, corners, holes, studs, designated portions of a surface and intersections of surfaces. The illumination source and sensor are both mounted within a single housing in a specific position and orientation relative to one another, thereby permitting the system to be internally calibrated. In addition, the sensor-illuminator unit is preferably mounted in a test fixture so that the light source is substantially normal to the surface of the part to be examined and the sensor is thereby positioned at a perspective angle relative thereto.

3 Claims, 5 Drawing Figures

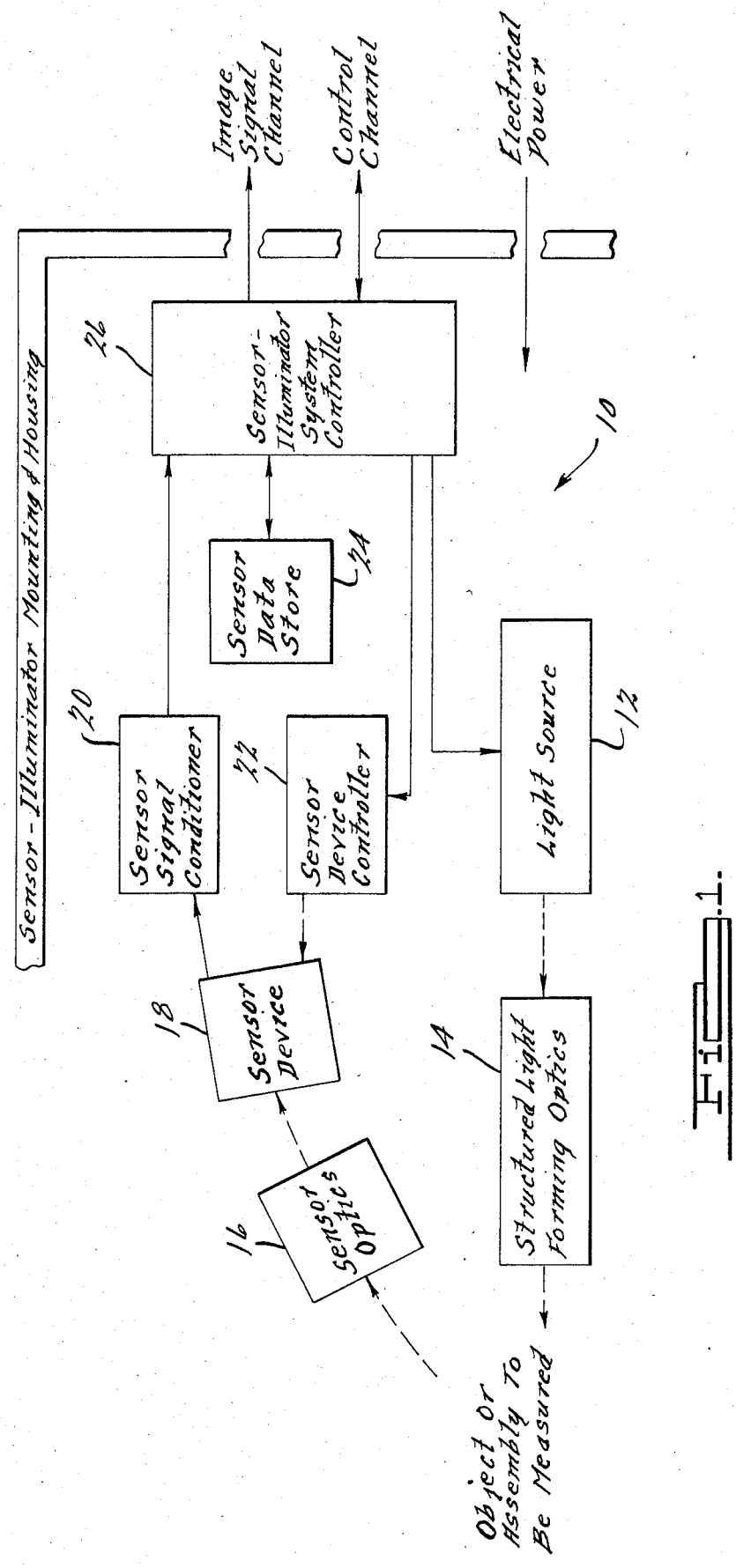

SENSOR-ILLUMINATION SYSTEM FOR USE IN THREE-DIMENSIONAL MEASUREMENT OF OBJECTS AND ASSEMBLIES OF OBJECTS

BACKGROUND AND SUMMARY OF THE INVENTION

The present invention relates to sensor-illumination systems and in particular to an intelligent machine vision sensor-illumination system for use in three-dimensional measurement of objects and assemblies of objects.

In the manufacture of parts and assemblies by processes such as stamping, extrusion, drawing and casting from materials such as sheet or bulk metal, plastic, film rubber and the like, it is often required that accurate dimensional measurements be performed either on-line as the manufacturing process operates upon the part or assembly, or off-line upon samples temporarily removed from the manaufacturing production line. In order to obtain economies of manufacturing and produce high quality products, it is necessary that measurements be made to ensure that dimensional tolerances are maintained. Such measurements must be made rapidly at many points on each produced part or assembly and in such a manner that the part or assembly itself is not touched or otherwise affected substantially by the measurement process itself. Measurements are often required to be performed which determine the position in three-dimensional space of certain identified points or features which exist on the manufactured part or assembly. Such points or features typically include edges, corners, holes, designated portions of a surface, studs and intersections of surfaces. Special and general purpose computers exist which are capable of determining such measurements from image data produced by sufficiently intelligent sensor-illuminator systems.

Presently available sensor-illuminator systems are typically subject to several shortcomings. For example, many systems are highly specialized and provide limited three-dimensional data, thus limiting their application. Other more sophisticated systems tend to be overly complex and large in physical size making practical use of such systems virtually impossible. In addition, these systems also suffer from the problem of producing such complex image data that the required computer processing time to assimilate the data becomes excessive, thus further restricting practical application.

It is therefore an object of the present invention to provide an intelligent sensor-illuminator system that is capable of exercising significant self-control and yet is extremely compact in physical size.

In addition, it is an object of the present invention to provide a sensor-illuminator system that produces a unique structural illumination pattern which results in the production of image signals which permit an attached machine vision computer to dimensionally measure and locate a wide variety of surfaces and shapes, including planar surfaces at any orientation, curvilinear surfaces, holes and protrusions.

It is a further object of the present invention to provide a completely self-contained sensor-illuminator system that has permanently stored therein calibration and identification data which permits ready replacement of a faulty unit without the need for generating new calibration data.

It is also an object of the present invention to provide an intelligent sensor-illuminator system for making three-dimensional measurements which provides sufficient image data to an attached machine vision computer for such purposes without imposing an unduly complex computational burden on the computer.

In general, the present invention comprises a completely self-contained intelligent machine vision sensor-illumination system which includes a laser source preferably positioned normal to the surface of the part or assemblage of parts to be inspected, for projecting onto the surface a structured illumination which in the preferred embodiment is in the form of a cross hair pattern. A solid-state sensor device precisely located within the unit at a perspective angle relative to the angle of illumination and associated electronics produce image signals representing the projection of the structured light pattern on the surface of the part or assembly as viewed from such perspective angle. Control circuitry within the unit transmits to an attached machine vision computer specific calibration data prestored in the unit which is usable by the computer to accurately determine the three-dimensional position and orientation of the illuminated part or assembly from the image signals. The present invention also preferably includes control and communication elements permitting economical and rapid operation of a large number of sensor units in conjunction with a single attached machine vision computer and control cable, and under highly variable conditions of object light reflectance, sensor to computer cable connection distance and specific measurement point specification.

Additional objects and advantages of the present invention will become apparent from a reading of the detailed description of the preferred embodiment which makes reference to the following set of drawings in which:

BRIEF DESCRIPTION OF THE DRAWINGS

FIG. 1 is a block diagram of a sensor-illumination system according to the present invention;

DETAILED DESCRIPTION OF THE PREFERRED EMBODIMENT

Figure 1A:
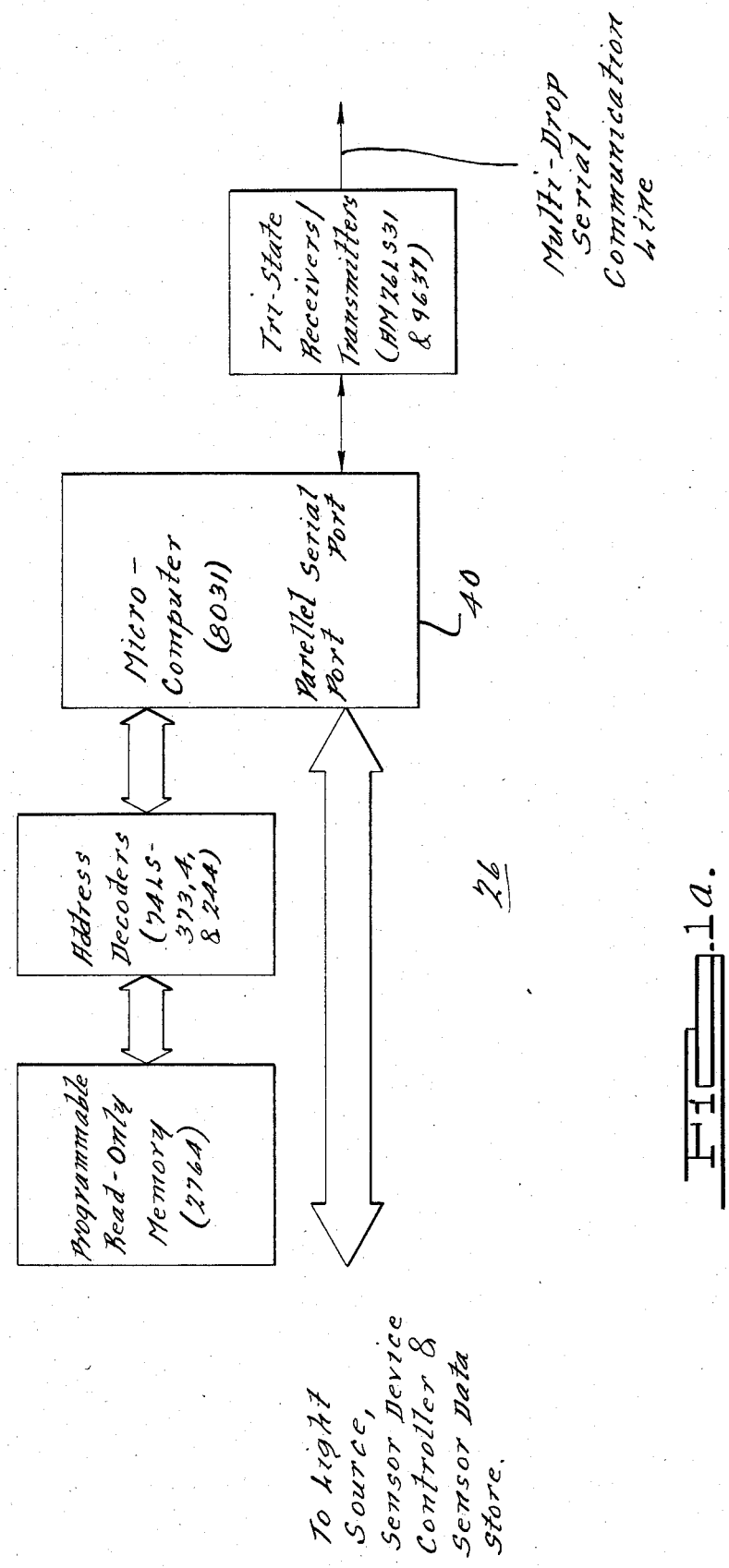
FIG. 1a is a more detailed block diagram of the sensor-illuminator system controller 26 shown in FIG. 1.

Referring to FIG. 1, a block diagram of the sensor-illuminator system 10 according to the present invention is shown. The present invention comprises a triangulation-type sensor-illumination system wherein the sensor and illumination source are positioned at an angle relative to one another so that the sensor obtains a perspective view of the light projected on the part or assembly of parts to be inspected. However, for reasons to be subsequently explained in detail, the preferred application of the present invention departs from conventional practice and positions the light source normal to the surface of the part to be inspected and the sensor at a perspective angle relative thereto. As will be seen, significant advantages are derived from this orientation.

In addition, the light source and sensor in the present invention are mounted at a predetermined angle within the same housing which, as will also be seen, permits the present sensor-illumination system 10 to be internally calibrated, thereby permitting convenient replacement of defective units on a test fixture.

The light source 12 mounted within the unit generates a narrow beam of light which may be either coherent light such as from a laser or laser diode, or non-coherent light, such as from a flourescent or incandescent source or light emitting diode. In the preferred embodiment a laser light source is used. One of the principal features of the present invention is the structured light pattern utilized to illuminate the object to be inspected. In the preferred embodiment, this structured light pattern consists of a cross hair configuration. This light pattern is created by structured light forming optics 14 which operate upon the beam of light emitted by the laser light source 12 to transform the beam of light into the desired projected light pattern. The resulting structured light pattern is preferably projected onto the object or assembly to be inspected at an angle normal to the surface of the part.

The sensor device 18 in the unit receives the reflected light image through a set of sensor optics 16 which may comprise conventional camera optics in combination with spectral, temporal, or polarizing filters. The sensor optics 16 serve to focus the reflected light image upon the surface of the sensor device and filter a portion of the light reflected from the object so that the image formed on the surface of the sensor device is restricted to only that resulting from the reflected light originating from the laser source. The sensor device 18 transduces the light image into electrical signals whose signal values are approximately proportional to the intensity of the light at each resolvable point of the image. The sensor device 18 may comprise a rectangular or other suitable two-dimensional array of electro-optical semiconductor devices including photo-diodes, charge-coupled devices, charge injection devices, or metal-oxide-silicon devices.

The electrical output signals from the sensor device 18 are provided to a sensor signal conditioning circuit 20 which filters and amplifies the image signals from the sensor. In addition, the sensor signal conditioning circuit 20 produces timing signals to permit the synchronous transmission of the image signals to a remotely attached machine vision computer. The sensor signal conditioning circuit 20 comprises conventional digital and analog communications circuitry well known to those skilled in the art. Similarly, the sensor device controller 22 comprises conventional electronic video frequency analog and digital circuits which provide timing and required address and control signals to the sensor device 18 for controlling the sequencing and operation of the sensor device to permit the device to develop a usable image under conditions of varying illumination levels, part reflectance characteristics, temperature and electrical power.

The sensor data storage circuit 24 comprises non-volatile, programmable or non-programmable read-only memory (e.g., EPROM or ROM), and is used to store data which uniquely identifies each individual sensor-illuminator system to any machine vision computer which might interrogate the sensor system. In addition, the data store circuit 24 is used to store the calibration data of the sensor-illuminator 10 for subsequent transfer, upon request, to the machine vision computer.

The sensor-illuminator system controller 26 is a microprocessor-based circuit which provides overall sequencing and signal flow control between all of the above noted sensor-illuminator system circuits and the machine vision computer. The interconnection between the sensor-illuminator system 10 and the machine vision computer includes an image signal channel via which the conditioned sensor signal from the sensor signal conditioning circuit 20 is transferred to the computer, and a control channel via which the machine vision computer interrogates or commands the sensor-illuminator system and receives acknowledgements of interrogation and commands and sensor data upon request.

With additional reference to FIG. 1a, a more detailed block diagram of the system controller 26 is shown. The system controller 26 operates, under control of its microcomputer logic, by interpreting each data transmission that occurs on the control channel to which it is aattached. When a data transmission is prefaced by the unique identification number of the sensor-illuminator unit 10, the microcomputer 40 accepts and stores the remainder of the data transmission and acknowledges the transmission by transmitting a response including its unique identity code. The system controller 26 then proceeds to execute the control actions indicated by the data sequence which it received and stored. These actions may include opening or closing the light source shutter, transmitting the signals for an image, or transmitting stored calibration data.

Figure 2:
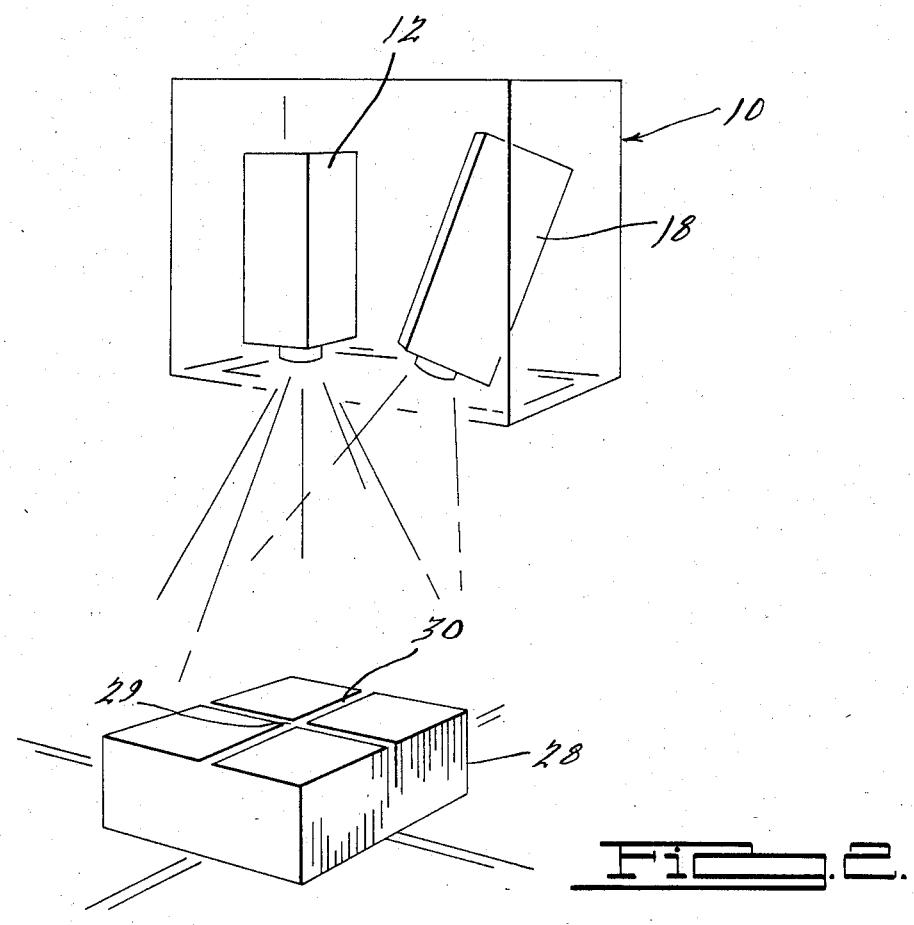
FIG. 2 is an exemplary diagrammatical view illustrating the preferred orientation of the present sensor-illuminator system relative to the part to be inspected.

Turning to FIG. 2, a diagrammatical view of the preferred orientation of the sensor-illuminator system 10 of the present invention relative to a part to be inspected is shown. Contrary to prior art systems, the present sensor-illuminator system 10 is intended to be secured to a fixture so that the illumination source 12 is positioned substantially normal to the surface of the part 28 to be inspected. In this manner, the center of the cross hair light pattern 30 is projected directly onto the specific point of interest 29 on the surface of the part 28. The sensor device 18 within the unit 10 is thereby positioned at a specified angle relative thereto so that the sensor obtains a perspective image of the light pattern 30 on the part. Ideally, this angle of displacement is substantially equal relative to each light plane in the projected cross hair light pattern 30.

Figure 3:
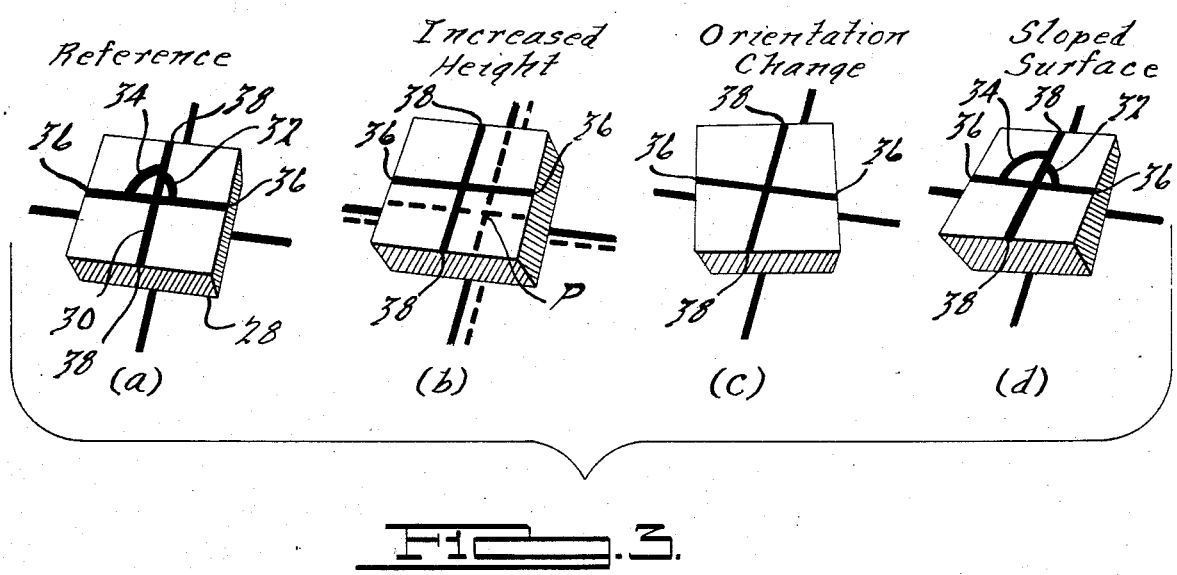
FIG. 3 is an exemplary diagrammatical view illustrating the resulting images of the projected cross-hair light pattern, as perceived by the sensor, due to surface variations in the inspected part.

With additional reference to FIG. 3, the advantages of the cross hair light pattern will now be explained. In illustration (a) in FIG. 3, the perspective view of the sensor of the projected cross hair light pattern 30 on an exemplary square part in a preselected reference position is shown. Note that due to the perspective view of the sensor, the lines of the cross hair light pattern 30 are broken by the edges of the part 28. As will be appreciated by those skilled in the art, the position, size and orientation of the reference part are defined by the included angles 32 and 34 between the crossed lines of the projected light image and the locations of the end points 36 and 38, which define the lengths of the lines and the translation of the line segments projected on the surface of the part relative to the line segments projected off the part.

Thus, for example, a variation in the z-axis, as illustrated in (b) (ignoring for the moment the phantom lines), is readily detected by the present sensor-illuminator system due to the resulting translation in the line segments perpendicular to their direction, as identified by the change in the locations of the end points 36 and 38. Similarly, a change in the orientation of the part in the x-y plane, as shown in illustration (c), is readily identifiable by the resulting change in the lengths of the line segments projected onto the surface of the part, again as defined by the location of the end points 36 and 38. In illustration (d) the slope of the part surface has been changed relative to the reference position, which change is detectible by the change in the included angles 32 and 34 between the crossed lines. Thus, it will be appreciated that the use of the cross hair light pattern provides an effective means of readily detecting variations from a specified reference in all three dimensions. It will further be appreciated that similar three-dimensional observations can be made for other types of common part configurations and characteristics such as holes, edges, corners, studs, designated portions of a surface, and intersections of surfaces. Moreover, if a more complex configuration is to be examined, such as an irregularly shaped hole, the present invention is readily adaptable to such an application by modifying the structured light pattern to add additional radiating lines as needed to uniquely define the features of interest in the configuration of the hole.

Returning briefly to illustration (b) in FIG. 3, the advantage of orienting the light source 12 and sensor 18 as shown in FIG. 2 will now be explained. In conventional triangulation-type sensor-illumination type systems, it has uniformly been the practice to position the sensor device normal to the surface of the part or assembly to be inspected and to locate one or more light sources at perspective angles relative thereto so that the projected image or images appear directly below the sensor. The disadvantage with this approach is that while a variation in height (z-axis) can be detected, the actual amount of the variation at the point of interest on the surface of the part cannot be accurately measured. Specifically, if the positions of the light source 12 and sensor 18 are reversed relative to the positions as shown in FIG. 2, the resulting image of the projected cross hair light pattern, as viewed by the sensor, will appear as shown in phantom in illustration (b) in FIG. 3. While a variation in height can be detected by the translation of the line segments of the cross hair image projected on the surface of the part, the actual height of the part at the desired point of interest 29 can only be inferred from the height at point P. In other words, if the surface of the part is not flat, the height at point 29 cannot be accurately measured by this conventional arrangement. Thus, it will be appreciated that in order to accurately measure height variation with a triangulation-type sensor-illumination system, the precise location of the projected light image must be known. Hence, the present invention preferably locates the light source normal to the point of interest on the surface of the part.

Figure 4:
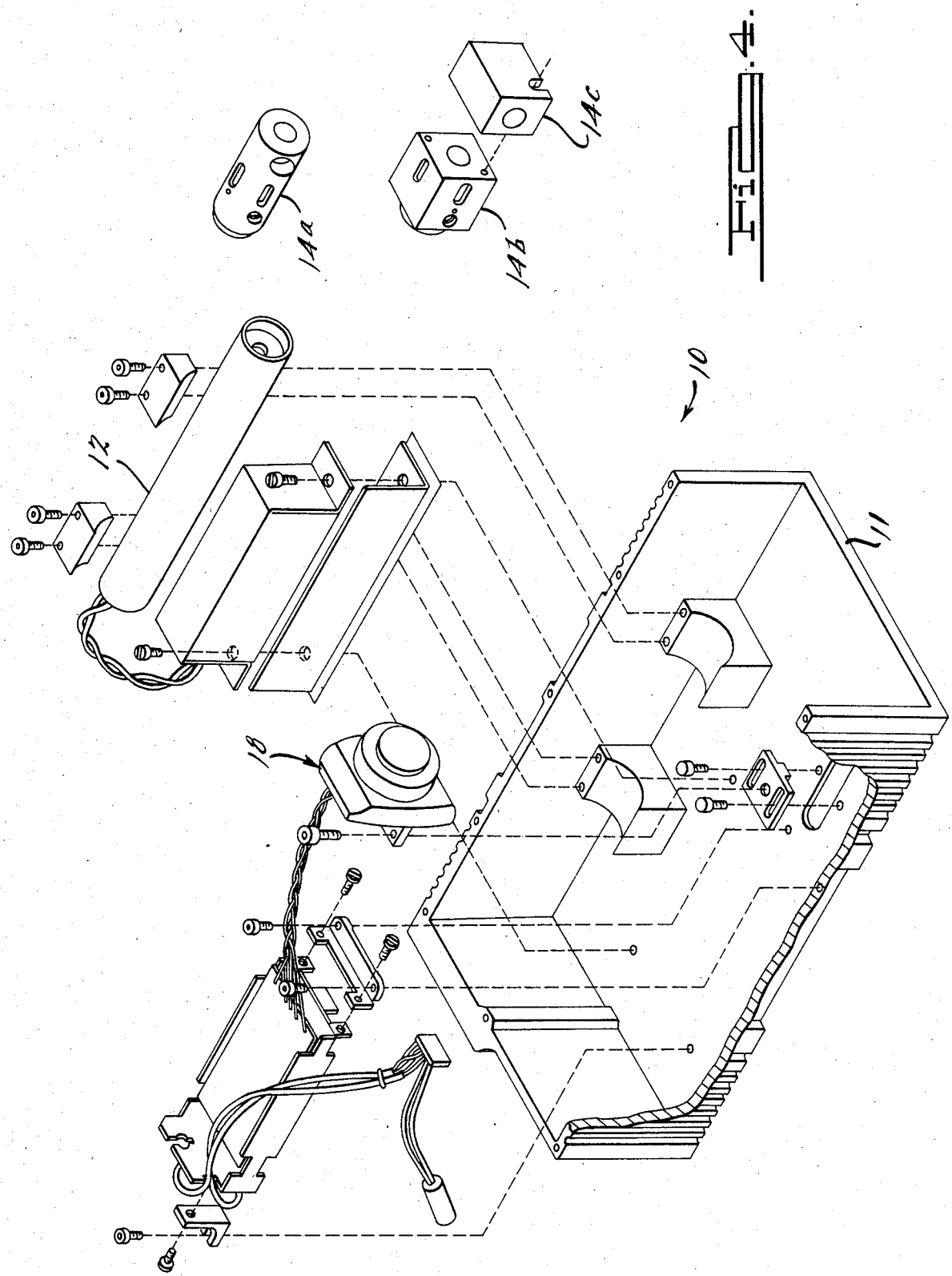
FIG. 4 is an exploded perspective view of the preferred manner in which the sensor and illuminator are mounted within the housing.

Referring now to FIG. 4, an exploded perspective view of the construction of the sensor-illuminator unit 10 according to the present invention is shown. The various printed circuit boards containing the aforementioned circuits identified in connection with the description of FIG. 1 have been deleted for clarity. As noted previously, an important feature of the present invention derives from the fact that the illumination source 12 and the sensor device 18 are both precisely located within the same housing 11. In this manner, the precise geometric relationship between the two components is predetermined and fixed and therefore readily repeatable from unit to unit. In addition, the unit housing 11 is also provided with five precisely located mounting points—one on each exterior surface of the housing except the front—which, together with the self-calibration feature of the present invention, permits defective units to be replaced in a fixture without having to recalibrate the system.

Mounted to the output end of the laser light source 12 are the structured light forming optics 14 which transform the laser beam into the desired cross hair light pattern. Initially, the beam is applied to an optical assembly 14a containing diverging and focusing lens which focus the beam to the desired standoff distance. The focused beam is then applied to a beam splitter (i.e., a partially silvered mirror) and mirror located within assembly 14a which splits the beam into two parallel beams. Lastly, the beams are passed through an optic unit 14b containing a pair of cylindrical lenses oriented 90° relative to each other, to form the desired line images. The cylindrical lenses are preferably mounted in eccentric holders to permit the crossing of the lines to be controlled by rotation of the lenses. In addition, it is preferable that the displaced beam be applied to the horizontally disposed cylindrical lens so that it produces the vertical light plane in the cross hair pattern. In this manner, the vertical plane can be steered upward to intersect with the horizontal light plane so that the center of the cross hair is aligned with the axis of the laser beam.

Once the unit 10 is fully assembled, calibration data for storage in the sensor data storage circuit 24 of the system is generated. This is performed in the following manner. Each sensor-illuminator unit 10 has associated therewith a specified point on the unit with respect to which all calibration data is referenced. The calibration data or "rectification table" generated for each sensor comprises a list by row and column number of each resolvable point or "pixel" in the rectangular array of the sensor, followed by the location of a point in three-dimensional space as measured from the specified reference point of the unit. Two such tables are generated for each sensor; one for each line in the cross hair light pattern.

In that the position of the light source 12 relative to the sensor 18 is fixed upon assembly of the unit 10, the illumination of each resolvable point or "pixel" within the sensor's array by reflectance from one of the two line images in the light pattern, uniquely defines in three dimensional space the position of an object. In other words, if a particular point in the sensor's array is being illuminated by reflectance from one of the lines in the light pattern, then the surface of an object must be located at a precise point in three-dimensional space relative to the reference point of the sensor-illuminator unit 10. It is the x, y and z measurements of this point relative to the specified reference point on the unit 10 which are stored adjacent the row and column number defining the pixel in question. The rectification table thus comprises, as noted, x, y and z measurement information for each pixel in the sensor's array.

Once generated, the rectification table, along with a unique identification code, are permanently stored in the sensor data store circuit 24 of the unit 10. When subsequently installed in a test fixture and connected to a machine vision computer, the sensor-illuminator unit 10 will upon request transfer the contents of its rectification table and its identification code over the control channel to the computer. in use, when a particular pixel in the sensor's array is illuminated, the computer can determine by reference to the appropriate rectification table, the location of the object in three-dimensional space. Note that from the lines defined by the end points 36 and 38 (FIG. 3), the computer can readily determine which line in the light pattern is illuminating the pixel in question.

Thus, it will be appreciated that with the sensor-illuminator system of the present invention, if a particular unit on a test fixture should fail, it can readily be replaced by another unit without having to recalibrate the new unit in the fixture. Moreover, because all image data transmissions from a sensor-illuminator unit 10 to a machine vision computer are accompanied by the unique identification code for the unit, the computer will readily be able to determine that a new unit has been installed and thereby avoid the possible error of applying the image data received from the new unit to the rectification table received from the old unit.

With conventional sensor-illumination systems the sensors and light sources are mounted separately. Therefore, the calibration data for each sensor cannot be generated until after the sensor and light sources are installed in the fixture at the test site. Accordingly, when a sensor failure occurs, the calibration process must be repeated for the new sensor before operation can continue. Because the calibration process is quite tedious and time consuming, this can present a severe disadvantage in production line operations which of necessity would therefore have to be shut down until the recalibration process was completed.

The following is a listing of the software for the microcomputer 40 in the sensor-illuminator system controller 26. The software is written in Intel's PL/M-51 version of PL1 language.

```
ISIS-II PL/M-51 V1.0
COMPILER INVOKED BY:    PLM51 :FO:SENPRO $TITLE ('SENPRO-SENsor PROgram executive 7-28-83 10AM')
/* THIS ROUTINE IS INTENDED TO MONITOR COMMANDS FROM THE PIXAL
   PROCESSOR. THESE COMMANDS INCLUDE:
        1.  BURN A BYTE OF DATA IN THE EPROM.
        2.  READ A SECTION OF EPROM BACK TO THE PROCESSOR.
        3.  SET A CONTROL BIT.
        5.  CLEAR A CONTROL BIT.

EPROM ASSIGNMENT IS AS FOLLOWS:
                TOP OF EPROM
                +-------------+
        1FFFH   !             !   CORRECTION BYTE FOR ZERO LS CHECK SUM BYTE
        1FFEH   !             !   MS BYTE OF CHECK SUM
        1FFDH   !             !   MS BYTE OF LOCAL ADDRESS
        1FFC    !             !   LS BYTE OF THE LOCAL ADDRESS
                ! LOCATIONS   !
                ! AVAILABLE   !
                /    FOR      /
                / PROCESSOR   /
                !   BURN      !
        800H    !             !   BOTTOM OF DATA TABLE
                +-------------+
        7FFH    !             !   TOP OF FIRMWARE ALLOTMENT
                ! RESERVED    !
                /    FOR      /
                / FIRMWARE    /
        0000H   !             !   BOTTOM OF EPROM
                +-------------+*/

1   1   SENSOR_PROGRAM:DO;
2   1       DECLARE VERSION LITERALLY '1';
3   1       DECLARE VERSON BYTE PUBLIC;
4   1       DECLARE CHECK_SUM BYTE PUBLIC;
5   1       DECLARE DATA_GONE BIT PUBLIC;
6   1       DECLARE BAUD_COUNT LITERALLY '0FDH';
7   1       DECLARE L LITERALLY '0FFH';
8   1       DECLARE DATA_NO_GOOD BIT PUBLIC;
9   1       DECLARE MEMORY_BASE WORD PUBLIC;
            /* COMPUTE BAUD COUNT FROM 260-(OSCILLATOR FREQ/192/BAUD RATE)
               OR USE FOLLOWING TABLE:
               BAUD RATE    2MHZ OSC   ER%    3.5MHZ  ER%
                  300        0DDH              0A1H
                  600        0EFH              0DDH
```

```
                          1200      0F7H     7.6     0DCH
                          9600      0FFH     8.5     0FDH*/

/*****************************************************/
               /*EXTERNAL PROCEDURES*/
10   2            GET_COM:PROCEDURE EXTERNAL;
11   1               END GET_COM;

12   2            SET_BAUD:PROCEDURE (B_COUNT) EXTERNAL;
13   1               DECLARE B_COUNT BYTE; END SET_BAUD;

15   1            NOTHING: PROCEDURE EXTERNAL; END NOTHING;

17   1            BURN: PROCEDURE EXTERNAL; END BURN;

19   1            READ_MEMORY: PROCEDURE EXTERNAL; END READ_MEMORY;

21   1            SET_BIT: PROCEDURE EXTERNAL; END SET_BIT;

23   1            READ_PORT_ONE: PROCEDURE EXTERNAL; END READ_PORT_ONE;

25.  1            CLEAR_BIT: PROCEDURE EXTERNAL; END CLEAR_BIT;

27   1            GET_VERSION:PROCEDURE EXTERNAL; END GET_VERSION;

29   2            EXPANSE: PROCEDURE (FFS) EXTERNAL;
30   1               DECLARE FFS ADDRESS; END EXPANSE;
                   /*ALL THIS TO SATISFY A TABLE OF F'S*/

32   1            CHECKSUM: PROCEDURE EXTERNAL; END CHECKSUM;

34   1            WATCH_DOG_TEST: PROCEDURE EXTERNAL; END WATCH_DOG_TEST;
               /*******************************************************/

36   1            DECLARE CT(50) BYTE PUBLIC;/*CT=COMMAND_TABLE*/
37   1            DECLARE POINTER BYTE PUBLIC;
38   1            DECLARE PORT_ONE BYTE AT(90H) REGISTER;
39   1            VERSON = -VERSION;
40   1            PORT_ONE = 84H; /*TO CLEAR ALL BITS EXCEPT TRANSMIT DISABLE*/
41   1            CALL SET_BAUD(BAUD_COUNT);/* SETUP THE BAUD RATE ETC*/
42   1            MEMORY_BASE = 0;/*THE START OF MEMORY*/
43   1            DATA_GONE = 1;/*CLEAR THE TRANSMIT BUSY FLAG*/

44   2            DO_JOB: DO WHILE 1;/*DO THE WORK NEEDED*/

45   2               CALL GET_COM;/*GET A COMAND STRING*/
46   2               IF DATA_NO_GOOD =0
                              AND
                        CT(3) < 11 THEN DO;
48   4               DO CASE (CT(3));
49   4                  /*0: */CALL NOTHING;
50   4                  /*1: */CALL BURN;
51   4                  /*2: */CALL READ_MEMORY;
52   4                  /*3: */CALL SET_BIT;
53   4                  /*4: */CALL NOTHING;
54   4                  /*5: */CALL CLEAR_BIT;
55   4                  /*6: */CALL CHECKSUM;
56   4                  /*7: */CALL GET_VERSION;
57   4                  /*8: */CALL READ_PORT_ONE;
                        /*9: *?CALL WATCH_DOG_TEST;

58   4                  /*10: */CALL EXPANSE (.(L,L,L,L,L,L,L,L,L,L,L,L));

59   4               END;
60   3               END;
61   1            END DO_JOB;

62   1         END SENSOR_PROGRAM;
```

```
MODULE INFORMATION                    (STATIC+OVERLAYABLE)
   CODE SIZE                      =  007DH      125D
   CONSTANT SIZE                  =  000CH       12D
   DIRECT VARIABLE SIZE           =   37H+00H    55D+   0D
   INDIRECT VARIABLE SIZE         =   00H+00H     0D+   0D
   BIT SIZE                       =   02H+00H     2D+   0D
   BIT-ADDRESSABLE SIZE           =   00H+00H     0D+   0D
   AUXILIARY VARIABLE SIZE        = 0000H         0D
   MAXIMUM STACK SIZE             = 0004H         4D
   REGISTER-BANK(S) USED:           0
   110 LINES READ
   0 PROGRAM ERROR(S)
END OF PL/M-51 COMPILATION $TITLE ('SRVCRT-SeRViCe RouTines 7-29-83 1256')
 1   1       SERVICE_ROUTINES: DO;
 2   1          DECLARE VERSON BYTE EXTERNAL;
 3   1          DECLARE GLOBAL_COMMAND BIT EXTERNAL;
 4   1          DECLARE CT(50) BYTE EXTERNAL;
 5   1          DECLARE POINTER BYTE EXTERNAL;
 6   1          DECLARE MEMORY_POINTER WORD ;
 7   1          DECLARE MEMORY_BASE WORD EXTERNAL;
 8   1          DECLARE WORD_COUNT WORD;
 9   1          DECLARE (CK_MEMORY BASED MEMORY_BASE) (1000H) WORD AUXILIARY;
10   1          DECLARE (MEMORY BASED MEMORY_BASE) (2000H) BYTE AUXILIARY;
11   1          DECLARE PORT_ONE BYTE AT(90H) REGISTER;
12   1          DECLARE TAP BIT,
                    P10 BIT AT(90H) REGISTER,
                    P11 BIT AT(91H) REGISTER,
                    P12 BIT AT(92H) REGISTER,
                    P13 BIT AT(93H) REGISTER,
                    P14 BIT AT(94H) REGISTER,
                    P15 BIT AT(95H) REGISTER,
                    P16 BIT AT(96H) REGISTER,
                    P17 BIT AT(97H) REGISTER,
                    SPARE BIT;

/****************************************************/
             /****************************************************/
             /*EXTERNAL PROCEDURES*/

13   2       HEADER_OUT:PROCEDURE EXTERNAL; END;

15   2       END_O_XMIT:PROCEDURE EXTERNAL; END;

17   2       BYTE_OUT:PROCEDURE (OUT_BYTE) EXTERNAL;
18   2          DECLARE OUT_BYTE BYTE; END;

20   2       PREAMBLE: PROCEDURE EXTERNAL; END;

22   2       SEND_ACK: PROCEDURE EXTERNAL; END;

24   2       SEND_NAK: PROCEDURE EXTERNAL; END;
             /****************************************************/
             /****************************************************/
26   2       BYTES_TO_WORD: PROCEDURE (MSBYTE,LSBYTE) WORD PUBLIC;
27   2          DECLARE (MSBYTE,LSBYTE) BYTE;
28   2          DECLARE WRD WORD;
29   3          DO;
30   3             WRD = MSBYTE;
31   3             WRD = SHL(WRD,8);
32   3             RETURN  WRD + LSBYTE;
33   3             END;
34   1          END BYTES_TO_WORD;

/****************************************************/
```

```
/**************************************************************/
35   2      NOTHING: PROCEDURE PUBLIC;
36   1         END NOTHING;
/**************************************************************/
/**************************************************************/
37   2      EXPANSE: PROCEDURE (FFS) PUBLIC;
38   2         DECLARE FFS ADDRESS;
39   1         END EXPANSE;
/**************************************************************/
/**************************************************************/
40   2      BIT_TAP: PROCEDURE (TAP) PUBLIC;
41   2         DECLARE TAP BIT;
42   3         DO;
43   3            IF POINTER = 6
                        AND
                     CT(4) < 8 THEN DO;
45   5               DO CASE (CT(4));
46   5                  P10 = TAP;
47   5                  P11 = TAP;
48   5                  SPARE = TAP;/* WE CANNOT CONTROL P1.2*/
49   5                  P13 = TAP;
50   5                  P14 = TAP;
51   5                  P15 = TAP;
52   5                  P16 = TAP;
53   5                  SPARE = TAP;/* OR BIT 7*/
54   5               END;
55   5               IF GLOBAL_COMMAND = 0 THEN DO;
57   5                  CALL SEND_ACK;
58   5               END;
59   4            END;
60   3         END;
61   1      END BIT_TAP;
/**************************************************************/
/**************************************************************/
62   2      SEND_ACK_W_BYTE: PROCEDURE (BITE) PUBLIC;
63   2         DECLARE BITE BYTE;
64   3         DO;
65   3            IF GLOBAL_COMMAND = 0
                        AND
                     POINTER = 5 THEN DO;
67   4               CALL HEADER_OUT;
68   4               CALL BYTE_OUT(BITE);
69   4               CALL END_O_XMIT;
70   4            END;
71   3         END;
72   1      END SEND_ACK_W_BYTE;
/**************************************************************/
/**************************************************************/

/**************************************************************/
/**************************************************************/
73   2      SET_BIT: PROCEDURE PUBLIC;
74   3         DO;
75   3            CALL BIT_TAP(1);
76   3         END;
77   1         END SET_BIT;
/**************************************************************/
/**************************************************************/
78   2      CLEAR_BIT: PROCEDURE PUBLIC;
79   3         DO;
80   3            CALL BIT_TAP(0);
81   3         END;
82   1         END CLEAR_BIT;
```

```
/*****************************************************************/
/*****************************************************************/
83   2       BURN: PROCEDURE PUBLIC;
84   3          DO;
85   3             IF POINTER = 8
                          AND P17 = 0
                       THEN DO;
87   4                CALL PREAMBLE;
88   4                CALL BYTE_OUT(CT(6));
89   4                CALL END_O_XMIT;
90   4                MEMORY_POINTER = BYTES_TO_WORD(CT(4),CT(5));
91   4                   MEMORY(MEMORY_POINTER) = CT(6);
92   4                END;
93   4                ELSE DO;
94   4                   CALL SEND_NAK;
95   4                END;
96   3          END;
97   1       END BURN;

/*****************************************************************/
/*****************************************************************/
98   2       READ_MEMORY: PROCEDURE PUBLIC;
99   2          DECLARE I WORD;
100  3          DO;
101  3             IF GLOBAL_COMMAND = 0
                             AND
                       POINTER = 9
                          THEN DO;
103  4                MEMORY_POINTER = BYTES_TO_WORD(CT(4),CT(5));
104  4                WORD_COUNT = BYTES_TO_WORD(CT(6),CT(7));
105  4                CALL HEADER_OUT;
106  5                DO I = 1 TO WORD_COUNT;
107  5                   CALL BYTE_OUT (MEMORY(MEMORY_POINTER));
108  5                   MEMORY_POINTER = MEMORY_POINTER - 1;
109  5                END;
110  4                CALL END_O_XMIT;
111  4                END;
112  3          END;
113  1       END READ_MEMORY;
/*****************************************************************/
/*****************************************************************/

114  2       CHECKSUM:PROCEDURE PUBLIC;
115  2          DECLARE I BYTE, CK WORD;
116  2          DECLARE CK1 BYTE AT(.CK);
117  3          DO;
118  3             IF GLOBAL_COMMAND = 0
                             AND
                       POINTER = 5
                          THEN DO;
120  4                CK = 0;
121  5                DO I = 0 TO 0FFFH;
122  5                   CK = CK_MEMORY(I) + CK;
123  5                END;
124  4                CK1 = SHR(CK,8);
125  4                CALL HEADER_OUT;
126  4                CALL BYTE_OUT (CK1);
127  4                CALL BYTE_OUT (CK);
128  4                CALL END_O_XMIT;
129  4                END;
130  3          END;
131  1       END CHECKSUM;
/*****************************************************************/
/*****************************************************************/
132  2       GET_VERSION:PROCEDURE PUBLIC;
133  3          DO;
```

```
134   3              CALL SEND_ACK_W_BYTE (-VERSON);
135   3              END;
136   1          END GET_VERSION;
      /*************************************************************/
      /*************************************************************/
137   2          READ_PORT_ONE:PROCEDURE PUBLIC;
138   3              DO;
139   3                  CALL SEND_ACK_W_BYTE (PORT_ONE);
140   3              END;
141   1          END READ_PORT_ONE;
      /*************************************************************/
      /*************************************************************/
142   2          WATCH_DOG_TEST: PROCEDURE PUBLIC;
143   3              DO;
144   3                  IF GLOBAL_COMMAND = 0
                                  AND
                            POINTER = 5
                              THEN DO;
146   4                  CALL SEND_ACK;
147   5                  DO WHILE 1;/*WAIT HERE FOR RESET*/
148   5                      END;
149   4                  END;
150   3              END;
151   1          END WATCH_DOG_TEST;
      /*************************************************************/
152   1      END SERVICE_ROUTINES;
```

MODULE INFORMATION:              (STATIC+OVERLAYABLE)
    CODE SIZE                  = 01D9H         473D
    CONSTANT SIZE              = 0000H          0D
    DIRECT VARIABLE SIZE       =   04H+06H      4D+  6D
    INDIRECT VARIABLE SIZE     =   00H+00H      0D+  0D
    BIT SIZE                   =   02H+01H      2D+  1D
    BIT-ADDRESSABLE SIZE       =   00H+00H      0D+  0D
    AUXILIARY VARIABLE SIZE    = 0000H          0D
    MAXIMUM STACK SIZE         = 0004H          4D

REGISTER-BANK(S) USED:       0
    209 LINES READ
    0 PROGRAM ERROR(S)
END OF PL/M-51 COMPILATION

```
              $TITLE ('GET A COMMAND FROM THE PROCESSOR 7-28-83 08AM')
1    1        GET_COMMAND: DO;
2    2            CHAR_IN: PROCEDURE BYTE EXTERNAL;
                  /*GET A CHARACTER FROM THE S BUFFER WITH GOOD/NOGOOD FLAG*/
3    2            END; /*CHAR_IN*/

4    2            WAIT:PROCEDURE (COUNT) EXTERNAL;
5    2                DECLARE COUNT BYTE;
6    2                END;

7    2            CHAR_OUT:PROCEDURE (CHAR) EXTERNAL;/*SEND A CHARACTER TO
                                                       THE PROCESSOR*/
8    2                DECLARE CHAR BYTE;
9    2            END; /*CHAR_OUT*/

10   1            DECLARE CHECK_SUM BYTE EXTERNAL;
11   1            DECLARE COMMAND_GOOD BIT PUBLIC;
12   1            DECLARE GLOBAL_COMMAND BIT PUBLIC;
13   1            DECLARE DATA_NO_GOOD BIT EXTERNAL;
14   1            DECLARE CT(50) BYTE EXTERNAL;
15   1            DECLARE POINTER BYTE EXTERNAL;
16   1            DECLARE ADDRES WORD;
17   1            DECLARE MEMORY_BASE WORD EXTERNAL;

18   2        GET_COM: PROCEDURE PUBLIC;
```

```
19  2           DECLARE DLE LITERALLY '010H',
                    EOT LITERALLY '04H',
                    ACK LITERALLY '06H',
                    CHAR BYTE,
                    I BYTE,
                    (MEMORY BASED MEMORY_BASE) (2000H) BYTE AUXILIARY;

/****************************************************************/

20  2           COMMAND_GOOD = 0;
21  3           DO WHILE COMMAND_GOOD = 0;

22  3               CHAR = CHAR_IN;/* GET ONE*/

23  4               DO WHILE CHAR <> 55H;/*WAITING FOR START OF MESSAGE*/
24  5                  IF CHAR = DLE THEN DO;/* FOR AN IMBEDDED 55H*/
26  5                      CHAR = CHAR_IN;/*THIS DOESN'T COUNT*/
27  5                      END;
28  4                  CHAR = CHAR_IN;
29  4                  END;

30  3               CT(0) = CHAR;
31  3               CHECK_SUM = CHAR;
32  3               DATA_NO_GOOD = 0;/*REMOVE A BAD DATA FLAG*/
33  3               POINTER = 1;/*TO POSITION THE DATA IN THE TABLE*/

34  3               GET_TABLE_CHARACTER:
                        CHAR = CHAR_IN;/*GET ANOTHER*/
35  4                   DO WHILE CHAR <> EOT;/* THEN HAVE A DATA BYTE STUFF IT*/

36  5                       IF CHAR <> DLE THEN DO; /*IF 'DLE' WE HAVE A SPECIAL CASE*/
38  5                           CT(POINTER) = CHAR;
39  5                           CHECK_SUM = CHAR + CHECK_SUM;
40  5                           END;/*IF CHAR <> DLE*/
41  5                       ELSE DO;
42  5                           CHAR = CHAR_IN;/*STORE THIS BYTE EVEN IF EOT*/
43  5                           CT(POINTER) = CHAR;
44  5                           CHECK_SUM = CHAR + CHECK_SUM;
45  5                           END ;/*ELSE*/
46  4                       POINTER = POINTER + 1;/*COUNT THIS CHARACTER */
47  5                       IF POINTER > 49 THEN DO;
49  5                           POINTER = 49;
50  5                           DATA_NO_GOOD = 1;
51  5                           END;   /*THE IF*/
52  4                       CHAR = CHAR_IN;
53  4                   END; /*DO WHILE NOT EOT*/

54  4               IF CHECK_SUM <> 0 THEN DO;
56  4                   DATA_NO_GOOD = 1;
57  4                   END;

58  4               DO;
59  5                   IF CT(1) = 0FFH AND CT(2) =0FFH THEN DO;
61  5                       GLOBAL_COMMAND = 1;
62  5                       COMMAND_GOOD = 1;
63  5                       END;
64  5                   ELSE DO;
65  5                       IF CT(1) = MEMORY(1FFDH)
                                    AND
                                CT(2) = MEMORY(1FFCH) THEN DO;
67  6                           COMMAND_GOOD = 1;
68  6                           GLOBAL_COMMAND = 0;
69  6                           END;
70  5                       END;
71  4                   END;
72  3               END;
73  2           END;
```

```
74   2        BYTE_OUT:PROCEDURE(OUT_BYTE) PUBLIC;
75   2        DECLARE OUT_BYTE BYTE;
/************************************************************/
76   3        DO;
77   3           IF OUT_BYTE = 10H   OR
                    OUT_BYTE = 4     OR
                    OUT_BYTE = 55H   OR
                    OUT_BYTE = 0AAH  THEN DO;/*FOR DLE, EOT, OTHER
                           SENSOR CALL OR PROCESSOR CALL*/
79   4              CALL CHAR_OUT(10H);/*SEND DLE FIRST*/
80   4              END;
81   3           CALL CHAR_OUT(OUT_BYTE);/*SEND THE BYTE*/
82   3           CHECK_SUM = OUT_BYTE + CHECK_SUM;
83   3           END;
84   2        END;

/****************************************************************/
/****************************************************************/
85   2        PREAMBLE: PROCEDURE PUBLIC;
86   2          ' DECLARE XMIT_ENABLE BIT AT(92H) REGISTER;

/****************************************************************/

87   3           DO;/*OUTPUT THE HEADER*/
88   3              CALL WAIT(72);/*WAIT ONE BYTE TIME*/
89   3              XMIT_ENABLE = 0;/*ENABLE THE OUTPUT DRIVER*/
90   3              CALL WAIT(7H);/*FOR ABOUT ONE BIT TIME*/
91   3              CHECK_SUM = 0AAH;
92   3              CALL CHAR_OUT(0AAH);/*START THE TRANSMIT*/
93   3              CALL BYTE_OUT(0);/*CALL  MAMA*/
94   3              CALL BYTE_OUT(0);/*USE FULL NAME*/
95   3              END;
96   2           END;
/****************************************************************/
/****************************************************************/

97   2        HEADER_OUT: PROCEDURE PUBLIC;

/****************************************************************/

98   3           DO;/*OUTPUT THE HEADER*/
99   3              CALL PREAMBLE;
100  3              CALL BYTE_OUT(6);/*TELL HER WE HEARD WITH ACK*/
101  3           END;
102  2        END;

/****************************************************************/
/****************************************************************/

103  2        END_O_XMIT: PROCEDURE PUBLIC;
104  2        DECLARE DLE LITERALLY '010H',
                      EOT LITERALLY '004H',
                      XMIT_DISABLE BIT AT(092H) REGISTER,
                      DATA_HERE BIT AT(98H) REGISTER,
                      DATA_GONE BIT AT(99H) REGISTER;

/****************************************************************/

105  3           DO;/*NOW GET TO WORK*/
106  3              CALL BYTE_OUT (-CHECK_SUM);
107  3              CALL CHAR_OUT (EOT);/*FOR END OF MESSAGE*/
108  4              DO WHILE NOT DATA_GONE;/*WAIT UNTIL DATA IS ALL ON ITS WAY*/
109  4                 END;
```

```
110   3              CALL WAIT(72);/*FOR 1.4MS DELAY*/

111   3              XMIT_DISABLE = 1;/*RELEASE THE PARALLEL LINE*/
112   3              DATA_HERE = 0;/*CLEAR OUT ANY DIRTY OLD FLAGS*/
113   3              END;
114   2           END;

/*****************************************************************/
        /*****************************************************************/

115   2         SEND_NAK: PROCEDURE PUBLIC;

/*****************************************************************/

116   3           DO;/*OUTPUT THE HEADER*/
117   3              CALL PREAMBLE;
118   3              CALL BYTE_OUT(15H);/*TELL HER WE HEARD WITH NAK*/
119   3              CALL END_O_XMIT;
120   3           END;
121   2         END;

/*****************************************************************/
        /*****************************************************************/
122   2         SEND_ACK:PROCEDURE PUBLIC;
123   2           DECLARE CK BYTE;
124   3           DO;
125   3              CALL HEADER_OUT;
126   3              CALL END_O_XMIT;
127   3           END;
128   2         END;

129   1      END;
```

```
MODULE INFORMATION:                (STATIC+OVERLAYABLE)
    CODE SIZE                    = 0158H        344D
    CONSTANT SIZE                = 0000H          0D
    DIRECT VARIABLE SIZE         =   02H+02H     2D+   2D
    INDIRECT VARIABLE SIZE       =   00H+00H     0D+   0D
    BIT SIZE                     =   02H+00H     2D+   0D
    BIT-ADDRESSABLE SIZE         =   00H+00H     0D+   0D
    AUXILIARY VARIABLE SIZE      = 0000H          0D
    MAXIMUM STACK SIZE           = 0008H          8D
    REGISTER-BANK(S) USED:           0
    192 LINES READ
    0 PROGRAM ERROR(S)
END OF PL/M-51 COMPILATION

BIT-ADDRESSABLE SIZE         =   00H+00H     0D+   0D
    AUXILIARY VARIABLE SIZE      = 0000H          0D
    MAXIMUM STACK SIZE           = 0002H          2D
    REGISTER-BANK(S) USED:           0
    98 LINES READ
    0 PROGRAM ERROR(S)
END OF PL/M-51 COMPILATION
```

While the above description constitutes the preferred embodiment of the present invention, it will be appreciated that the invention is susceptible to modification, variation and change without departing from the proper scope or fair meaning of the accompanying claims.

We claim:

1. A triangulation-type sensor-illuminator assembly for generating image data usable by a machine vision computer to determine three-dimensional measurements of an object comprising:

a housing adapted for mounting to a test fixture supporting the object to be examined;

light source means fixedly mounted at a precise location and orientation within said housing for projecting onto said object a predetermined structured light pattern;

optical array sensor means for receiving the reflected light image off said object and producing electrical signals whose values are approximately proportional to the intensity of the light impinging upon said sensor means at each resolvable point in its array, said optical sensor means being fixedly mounted within said housing at a precise location and orientation relative to said light source means so that said sensor means obtains a perspective view of the image of said structured light pattern on said object; and control circuit means located within said housing and connected to said light source means and said optical sensor means and having stored therein for subsequent transfer to a machine vision computer to which said assembly may be connected, calibration data for said assembly comprising a list identifying with respect to each resolvable point in said sensor array the location in three-dimensional space relative to a reference point associated with said housing, the point at which said object must be located for such resolvable point to be illuminated by the reflected image of said structured light pattern.

2. The sensor-illuminator assembly of claim 1 wherein said control circuit means further has stored therein a code uniquely identifying said system which is adapted to be transmitted by said control circuit means to a machine vision computer to which said system may be connected.

3. The sensor-illuminator assembly of claim 1 wherein said housing is mounted to the test fixture supporting said object so that said predetermined structured light pattern is projected onto said object at an angle substantially normal to the surface of said object.

* * * * *